Patented Oct. 11, 1949

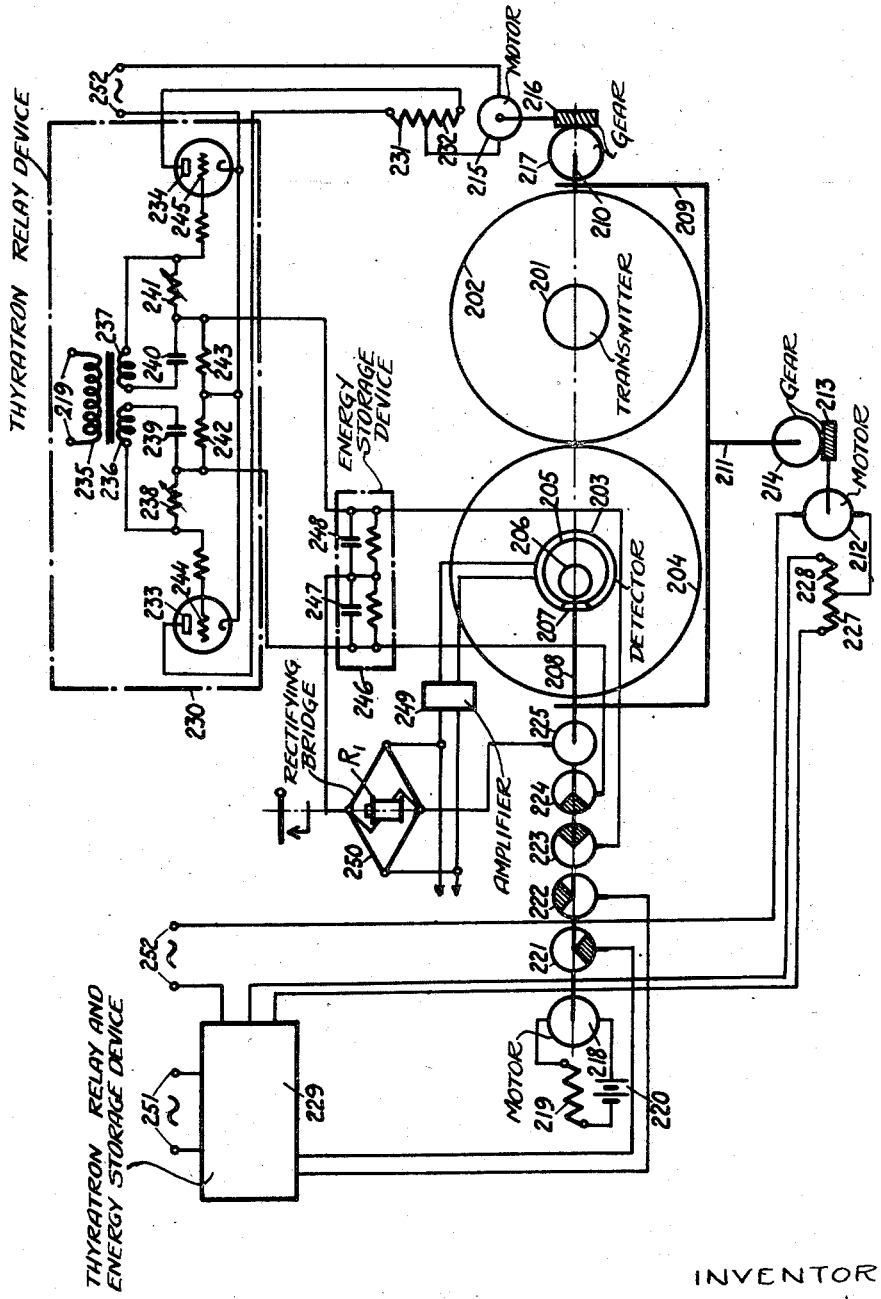

2,484,651

UNITED STATES PATENT OFFICE

2,484,651

RADIO DIRECTION FINDER

Helge Fabian Rost, Djursholm, Karl Harry Thunell, Nockeby, Sten Daniel Vigren, Stockholm, and Per Harry Elias Claesson, Jakobsberg, Sweden Application May 11, 1945, Serial No. 593,172
In Germany January 10, 1941

3 Claims. (Cl. 343—117)

The present invention relates to means for receiving echo-radio waves from an object in space for the control of an operating organ adapted to move said receiving means in either of two directions in at least one plane for following said object.

The receiving means is particularly suitable for automatically following a movable object, for example a flying machine or a ship.

According to the invention the receiving means comprises a single detector, a single wave directing means for receiving wave energy from a certain direction, said detector being located in the central region of said directing means, shifting means combined with said wave directing means and arranged alternately to allow wave energy from two equal parts of a searching field symmetrically located with respect to both sides of a central plane dividing the said searching field to pass to the said detector, control means connected between the detector and the operating organ for the transfer of received energy to said operating organ, whereby said control means are arranged to distribute and compare two successively received amounts of energy from said two parts of the searching field for actuating said operating organ in such a direction that the difference between said two successively received amounts of energy is lessened.

The invention will be explained more fully hereinafter with reference to the accompanying drawing, which illustrates automatic following of an object in space by means of a transmitter and a receiver.

In the drawing a transmitter 201 is an ultra-short wave transmitter provided with wave directing means in the form of a reflector 202 secured to a horizontal shaft 210. Secured to the same shaft is an ultra-short wave receiver or detector 203 with wave directing means in the form of a reflector 204. Placed between the detector 203 and the reflector 204 is a diaphragm device consisting of a rotating metal disc 205 provided with an excentric aperture 206 for the purpose of alternately admitting the passage of energy of radiation to the detector 203 from two equal parts symmetrically located on both sides of a central plane dividing the total searching field. The rotating disc, which is connected to the shaft 268 by means of a gearing 207, is driven by a motor 218, which is provided with a field winding 219 and a source of current 220.

The transmitter and the receiver with the motor 218 are rigidly mounted on a shaft 210 which is journalled in a fork 209. The horizontal shaft 210 is driven through a worm gearing 216—217 by a motor 215, so that the transmitter and the receiver may during a turning movement of 180° be directed in successive planes at different angles to the horizon. The fork 209 is provided with a vertical post 211 and with bearing means whereby the fork may also be turned with the transmitter and the receiver into any desired position in the horizontal plane by means of worm gearing 213—214 and a motor 212.

The latter is provided with two field windings 227 and 228 to drive the motor in one of two directions and 229 is a relay and energy storage device comprising thermionic valves known under the registered trade mark Thyratron and of the same construction and coupling as shown at the top of the drawing, and marked 230 and 246, for the motor 215, which causes rotation of the transmitter and the receiver about the shaft 210. The motor 215 is provided with two field windings 231 and 232 in combination with the Thyratron relay device 230 for rotation in one of two directions. The Thyratron relay device is of known type and comprises two gas-filled Thyratron tubes with a grid 244 and an anode 233 and a grid 245 and an anode 234 respectively. Each Thyratron tube is supplied with bias voltage by means of a coil 236 and 237 respectively constituting the secondary windings of a transformer having a primary winding 235. Connected in series with the secondary winding 236 are a variable resistance 238 and a condenser 239. Furthermore, one pole of each secondary winding is connected over a grid resistance to the respective Thyratron grid. Also, the left Thyratron is connected with a resistance 242 coupled between the cathode and grid in series with the variable resistance 238 and the grid resistance. The Thyratron on the right-hand side is connected in a similar manner.

The receiver or detector 203 is provided with an amplifier 249 with automatic volume control and with a rising amplifying degree for high frequencies. One side of a rectifier bridge 250 is connected to the amplifier 249, while the other side thereof is connected to a relay R1 and to a contact disc 225 on the shaft 208 and to the middle point of an energy storage device 246 for wave energy received. The outer side of said storage device 246 is connected with contact discs 223 and 224 to direct successively received wave energy from two different equally great parts of a field of search, said parts symmetrically being situated with respect to a vertical plane through an aiming line between the object and the receiver, to the Thyratron relay device 230 for the purpose of operating the motor 215 in one direction or the other.

For the guidance of the energy similarly received with respect to a horizontal plane through an aiming line between the object and the receiver there are provided contact discs 221 and 222 which are connected to the corresponding storage device for wave energy received from two equal parts located on either side of said plane dividing the total searching field, to storage device 229 and a Thyratron relay to rotate the motor in one direction or the other.

If during a previous search movement the transmitted directed ultra-short wave beam hits an object, a portion of the waves will be reflected and received by the receiver.

The following of the object then takes place in the following manner. Radiating energy from opposite, equally large parts of the total searching field is admitted through the previously described diaphragm device in the shown embodiment and consisting of the rotating body or disc 205 provided with an excentric aperture 206. The frequencies are conducted, on having passed through the bridge rectifier 250, over the contact rollers 221—225 to the energy storage device in the form of the condensers 247 and 248. Said condensers store the wave energy received, for instance, from the upper and lower parts respectively of the searching field, the cam discs 223 and 224 being adjusted in a corresponding relationship to the diaphragm device 205.

If the wave energy received from said opposed upper and lower parts of the searching field is of the same magnitude, the condensers will be charged to the same degree, and there will be no effect. On the other hand, should the charges be of a different magnitude, because the directing means is not directed exactly to the object, one of the condensers will be charged more than the other. The voltages thus produced actuate the grid voltages on the respective Thyratron relay devices 230. Thus more or less current will be admitted through the one or the other tube, more or less current being thus caused to pass one or the other field windings 231 or 232 of the motor 215, so that the latter rotates in one direction or the other.

In the same manner control of the motor 212 is obtained for movement in a horizontal direction through the contact rollers 221 and 222, the Thyratron relay and energy storage device 229 and the field windings 227 and 228.

In this manner, the device may be caused accurately to follow an object after it has once been located.

The present patent application is a continuation-in-part of our co-pending patent application Ser. No. 449,100, filed June 30, 1942, now Patent No. 2,420,264, issued May 6, 1947.

We claim:

1. Rotatable receiving means for receiving radiant energy from an object in space, said receiving means comprising energy directing means arranged for sharp energy-receiving direction, a detector located at a spot, at which the energy is concentrated by said energy directing means, shifting means combined with said energy directing means for alternately passing energy to the said detector from two equal parts of a scanning field symmetrically located with respect to both sides of a central plane dividing the said scanning field means for rotating said receiving means in either of two directions in at least one plane for directing the center line of said energy directing means at the said object for tracking same, the center line of said energy directing means being fixedly located in any of said central planes with respect to said shifting means, control means comprising distributing means connected between the detector and the rotating means for passing two successively received amounts of energy from said two parts of the scanning field in such a direction to the said rotating means that upon rotation of same in one or the other direction the difference between said two amounts of energy is lessened.

2. The receiving means as claimed in claim 1, in which said energy directing means is a reflector, and said shifting means is a body arranged to rotate eccentrically about the center line of said energy directing means.

3. The receiving means as claimed in claim 1, in which the said shifting means comprises a rotatable metal disk provided with an eccentric aperture.

HELGE FABIAN ROST.
KARL HARRY THUNELL.
STEN DANIEL VIGREN.
PER HARRY ELIAS CLAESSON.

REFERENCES CITED

The following references are of record in the file of this patent:

UNITED STATES PATENTS

| Number | Name | Date |
|---|---|---|
| 2,176,469 | Moueix | Oct. 17, 1939 |
| 2,277,464 | Taylor | Mar. 24, 1942 |
| 2,399,426 | Bradley | Apr. 30, 1946 |
| 2,412,612 | Godet | Dec. 17, 1946 |